United States Patent
Hosoi et al.

(10) Patent No.: US 9,404,807 B2
(45) Date of Patent: Aug. 2, 2016

(54) DEVICE AND METHOD FOR IDENTIFYING TEMPERATURE DETECTING RANGE

(71) Applicant: Azbil Corporation, Tokyo (JP)

(72) Inventors: Tomoki Hosoi, Tokyo (JP); Mitsuhiro Honda, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 490 days.

(21) Appl. No.: 13/924,347

(22) Filed: Jun. 21, 2013

(65) Prior Publication Data

US 2013/0343423 A1 Dec. 26, 2013

(30) Foreign Application Priority Data

Jun. 21, 2012 (JP) ................................ 2012-139485

(51) Int. Cl.
| | |
|---|---|
| *G01K 7/00* | (2006.01) |
| *G01K 15/00* | (2006.01) |
| *G01K 3/04* | (2006.01) |
| *G01K 1/02* | (2006.01) |
| *G01K 7/02* | (2006.01) |
| *G01K 7/42* | (2006.01) |

(52) U.S. Cl.
CPC ........ *G01K 3/04* (2013.01); *G01K 1/026* (2013.01); *G01K 7/02* (2013.01); *G01K 7/427* (2013.01); *G01K 2213/00* (2013.01)

(58) Field of Classification Search
USPC ..................................... 374/179, 137, 163, 1
See application file for complete search history.

(56) References Cited

FOREIGN PATENT DOCUMENTS

JP       2004-170375 A       6/2004

*Primary Examiner* — Mirellys Jagan
(74) *Attorney, Agent, or Firm* — Troutman Sanders LLC

(57) ABSTRACT

A detected temperature acquiring portion acquires detected temperatures from individual thermopile array sensors, a temperature change comparing portion compares changes in detected temperatures over time, for each respective location, between test locations selected from a overlapping region and individual comparing locations for two thermopile array sensors wherein planned detecting ranges partially overlap each other, to identify a best match location, a factor estimating portion, for each test location, generates an equation indicating a relationship between the best match location and positional shift factors, and establishes these equations as a system and solves the system of equations through a least-squares method to estimate the positional shift factors, and a detecting range identifying portion corrects location coordinates of the planned detecting ranges based on these positional shift factors to identify actual detecting ranges.

4 Claims, 10 Drawing Sheets

FIG. 4

| Array Sensor ASn | Detecting Element Snij | Detected Temperature tnij (°C) |
|---|---|---|
| AS1 | S111 | 24.6 |
| | S112 | 24.5 |
| | ⋮ | ⋮ |
| | S1IJ | 22.1 |
| ⋮ | | |

FIG. 5

| Array Sensor ASn | Location Coordinates |
|---|---|
| AS1 | X1,Y1 |
| AS2 | X2,Y2 |
| ⋮ | |

FIG. 6

| Array Sensor ASn | Detecting Range Coordinates | | | |
|---|---|---|---|---|
| AS1 | X11,Y11 | X12,Y12 | X13,Y13 | X14,Y14 |
| AS2 | X21,Y21 | X22,Y22 | X23,Y23 | X24,Y24 |
| ⋮ | | | | |

DEVICE AND METHOD FOR IDENTIFYING TEMPERATURE DETECTING RANGE

CROSS REFERENCE TO RELATED APPLICATION

This application claims priority to Japanese Patent Application No. 2012-139485, filed on Jun. 21, 2012, the entire content of which being hereby incorporated herein by reference.

FIELD OF TECHNOLOGY

The present invention relates to a temperature distribution detecting technology, and, in particular, relates to a temperature detecting range identifying technology for identifying a temperature detecting range for individual thermopile array sensors when detecting indoor temperature distributions using a plurality of thermopile array sensors.

BACKGROUND

In lighting systems, technologies are being researched by which to achieve energy conservation through identifying locations wherein individuals are present from temperature distributions within a space, to turn ON lighting in the vicinities thereof and to turn OFF lighting in areas wherein no individuals are present. Moreover, in air-conditioning systems there is research into technologies for using distributed thermohydraulic analysis techniques to estimate, from temperature distributions within a space and from target temperatures at locations within that space, air vent speeds and air vent temperatures for the individual air vents within the space. In this way, in control systems for controlling a space, temperature distribution detecting devices are used when detecting temperature distributions within the space.

Conventionally, in such temperature distribution detecting devices thermopile array is have been used as sensors for no-contact two-dimensional detection of the temperature distribution of a target object. See, for example, Japanese Unexamined Patent Application Publication 2004-170375. A thermopile array is an arrangement, in the form of an array on a semiconductor substrate, for example, of detecting elements made from thermal infrared sensors, specifically, thermopiles, for producing a thermal electromotive force in accordance with the amount of incident energy when incident infrared radiation is received from a target object. The thermopile array sensor enables simultaneous detection of a temperature distribution over a broad range, such as a space.

In this conventional technology, when installing thermopile array sensors within a space, the thermopile array sensors are disposed with equal spacing on an interior surface that forms the space, such as a ceiling, a wall, a floor, or the like, so that the detecting ranges of adjacent thermopile array sensors partially overlap each other so as to detect the temperature distribution within the space without gaps. If here, on the surface of the interior wall of the space equipment is installed, such as lighting equipment, air-conditioning equipment, fire prevention equipment, electrical equipment, or the like, and this equipment is installed at a location wherein a thermopile array sensor was planned to be installed, then the thermopile array sensor is installed near this equipment, and the detecting range of the thermopile array sensor is angled so as to partially overlap the detecting range of the adjacent thermopile array sensor as if it was installed in the location wherein it was planned.

However, with the conventional technology it is not possible to confirm whether or not the angled detecting range partially overlaps the detecting range of the adjacent thermopile array sensor, and thus if there is no partial overlap with the detecting range of the adjacent thermopile array sensor, there is a problem in that it will not be possible to detect the temperature distribution within the space without gaps. The present invention is to solve such a problem, and an aspect thereof is to provide a temperature distribution detecting technology wherein it is easy to confirm a partial overlap of detecting ranges for adjacent thermopile array sensors.

SUMMARY

In order to achieve the aspect set forth above, a temperature detecting range identifying device according to the present invention includes a storing portion that stores location coordinates of a planned detecting range over which a thermopile array sensor is to detect temperatures, for each of a plurality of thermopile array sensors installed in a space for which a temperature distribution is to be detected, a detected temperature acquiring portion that acquires detected temperatures from each individual thermopile array sensor, a temperature change comparing portion that compares, for two thermopile array sensors, from among all of the thermopile array sensors, having planned detecting ranges that partially overlap each other, for each test location on the side of one selected thermopile array sensor, within the overlapping region, with each comparing location on the side of the other selected thermopile array sensor, within the planned detecting region of the other thermopile array sensor, the change in detected temperatures over time, detected at the respective locations, to identify a best match location wherein the highest comparison result is obtained, a factor estimating portion that generates, for each test location, an equation expressing the relationship between the best match location for the test location and positional shift factors indicating a positional shift between a location coordinate indicating the test location and a location coordinate indicating the best match location, and that establishes these equations as a system and solving using the least-squares method to estimate the positional shift factors, and a detecting range identifying portion that identifies an actual identifying range for the other thermopile array sensor by correcting the location coordinates of the planned detecting range for the other thermopile array sensor based on the positional shift factors.

In one example of a structure of the temperature detecting range identifying device, set forth above, according to the present invention, when the location coordinates of the test location are defined as x, y, the location coordinates of the best match location are defined as x, y', and the positional shift factors are defined as c0, c1, c2, c3, c4, and c5, the equations are expressed as:

$x' = c0x + c1y + c2$; and $y' = c3x + c4y + c5$.

Moreover, a temperature detecting range identifying method according to the present invention includes a storing step wherein a storing portion stores location coordinates of a planned detecting range over which a thermopile array sensor is to detect temperatures, for each of a plurality of thermopile array sensors installed in a space for which a temperature distribution is to be detected, a detected temperature acquiring step wherein a detected temperature acquiring portion acquires detected temperatures from each individual thermopile array sensor, a temperature change comparing step wherein a temperature change comparing portion compares, for two thermopile array sensors, from among all of the thermopile array sensors, having planned detecting ranges that partially overlap each other, for each test location on the side of one selected thermopile array sensor, within the overlapping region, with each comparing location on the side of the other selected thermopile array sensor, within the planned detecting region of the other thermopile array sensor, the change in detected temperatures over time, detected at the respective locations, to identify a best match location wherein the highest comparison result is obtained, a factor estimating step wherein a factor estimating portion generates, for each test location, an equation expressing the relationship between the best match location for the test location and positional shift factors indicating a positional shift between a location coordinate indicating the test location and a location coordinate indicating the best match location, and establishes these equations as a system and solves using the least-squares method to estimate the positional shift factors, and a detecting range identifying step wherein a detecting range identifying portion identifies an actual identifying range for the other thermopile array sensor by correcting the location coordinates of the planned detecting range for the other thermopile array sensor based on the positional shift factors.

The present invention makes it easy to check the partial overlap of the detecting ranges for adjacent thermopile array sensors. Consequently, even if the detecting range of a thermopile array sensor is at an angle because the thermopile array sensor is installed near other equipment because equipment such as lighting equipment, air-conditioning equipment, fire prevention equipment, electrical equipment, or the like, is installed in the location wherein the thermopile array sensor was planned to be installed, still it is extremely easy to confirm that the detecting ranges of adjacent thermopile array sensors partially overlap, and thus it is possible to detect the temperature distribution within the space without gaps.

BRIEF DESCRIPTIONS OF THE DRAWINGS

FIG. 4 is an example of a structure for detected temperature data.

FIG. 5 is an example of a structure for location data.

FIG. 6 is an example of a structure for detecting range data.

DETAILED DESCRIPTION

Figure 1:
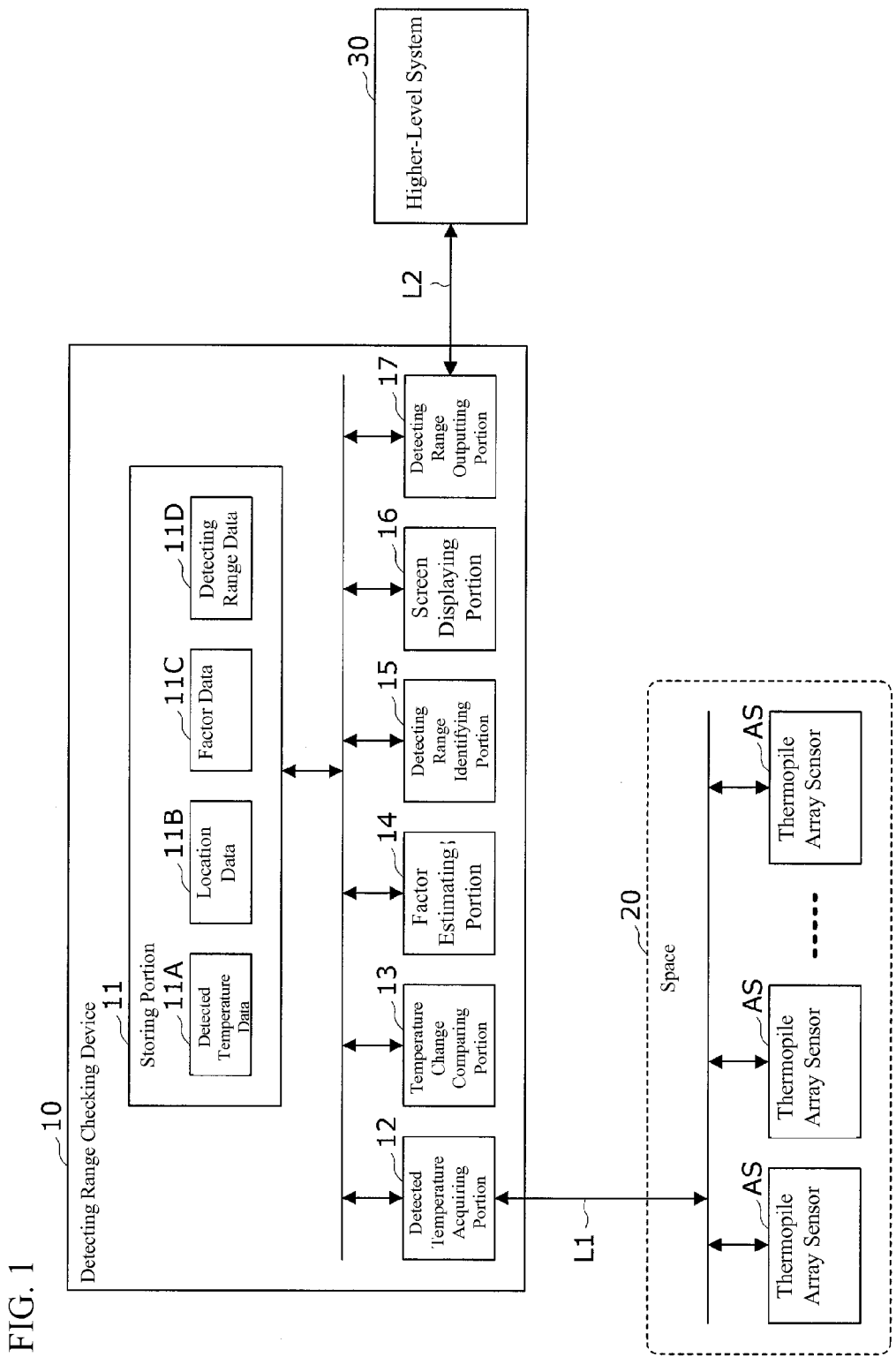
FIG. 1 is a block diagram illustrating a structure of a temperature distribution range detecting device.

The principle of the present invention will be explained first. When a plurality of thermopile array sensors is used to detect a temperature distribution within a space, in an overlapping region wherein there is a partial overlap of the detecting ranges of two adjacent thermopile array sensors, both thermopile array sensors detect the temperatures in parallel. For example, if there is a partial overlap in the detecting ranges of two thermopile array sensors, temperatures will be detected at the same position coordinates by a portion of the detecting elements within both thermopile array sensors.

The present invention focuses on a distinctive feature of the partial overlap of the detecting ranges in this type of temperature distribution detection, and detects the state of overlap of the detecting ranges of the two thermopile array sensors by comparing, between the two thermopile array sensors, the detected temperatures that are detected by the individual detecting elements that are located in the overlapping region, and, as a result, it is possible to use one of the thermopile array sensors as a reference to identify the shift in position between the planned detecting range of the other thermopile array sensor and the actual detecting range thereof. Doing so makes it possible to identify, from easily obtainable data, namely the detected temperatures, the positional shift between the planned detecting range and the actual detecting range.

Here when comparing the detected temperatures between both of the thermopile array sensors for the overlapping region, there is a case wherein only the detected temperatures at a given point in time are compared, and the case wherein temperatures that are detected at random times are detected. Moreover, due to factors in the manufacturing process, or the like, there may be relatively large detection tolerance errors of about 2 or 3° C. between thermopile array sensors. Consequently, when specifying the positional shift based on the comparison results obtained from the temperatures detected at a given point in time, a large tolerance error may occur in the positional shift that is produced.

On the other hand, the temperature within the space will vary depending on the work schedule within the company or the factory, and depending on the time of sunrise and sunset, where for identical location coordinates within the space, these variations in temperature will show identical variations over time. Moreover, these variations over time do not vary with the detection tolerance error between thermopile array sensors.

The present invention focuses on this distinctive feature of the temperature variation within the space, to detect the state of overlap between the two thermopile array sensors through comparing, between the two thermopile array sensors, the changes in detected temperatures over time, detected in the overlapping area, to use one thermopile array sensor as a reference to identify the positional shift between the planned detecting range of the other thermopile array sensor and the actual detecting range thereof. This makes it possible to identify with excellent accuracy the positional shift between the planned detecting range and the actual detecting range.

Forms for carrying out the present invention will be explained next in reference to the figures.

A temperature detecting range identifying device 10 according to an example will be explained in reference to FIG. 1. FIG. 1 is a block diagram illustrating a structure for a temperature detecting range identifying device.

The temperature detecting range identifying device 10, as a whole, is structured from an information processing device such as a server device, a personal computer controller, or the like, and has a function for estimating positional shift factors indicating the positional shifts of the detecting ranges of individual thermopile array sensors AS based on the respective detected temperatures obtained through a communication circuit L1 from each of a plurality of thermopile array sensors AS installed within a space 20 that is the subject of temperature detection, and a function for specifying the actual detecting ranges based on these positional shift factors.

Figure 2:
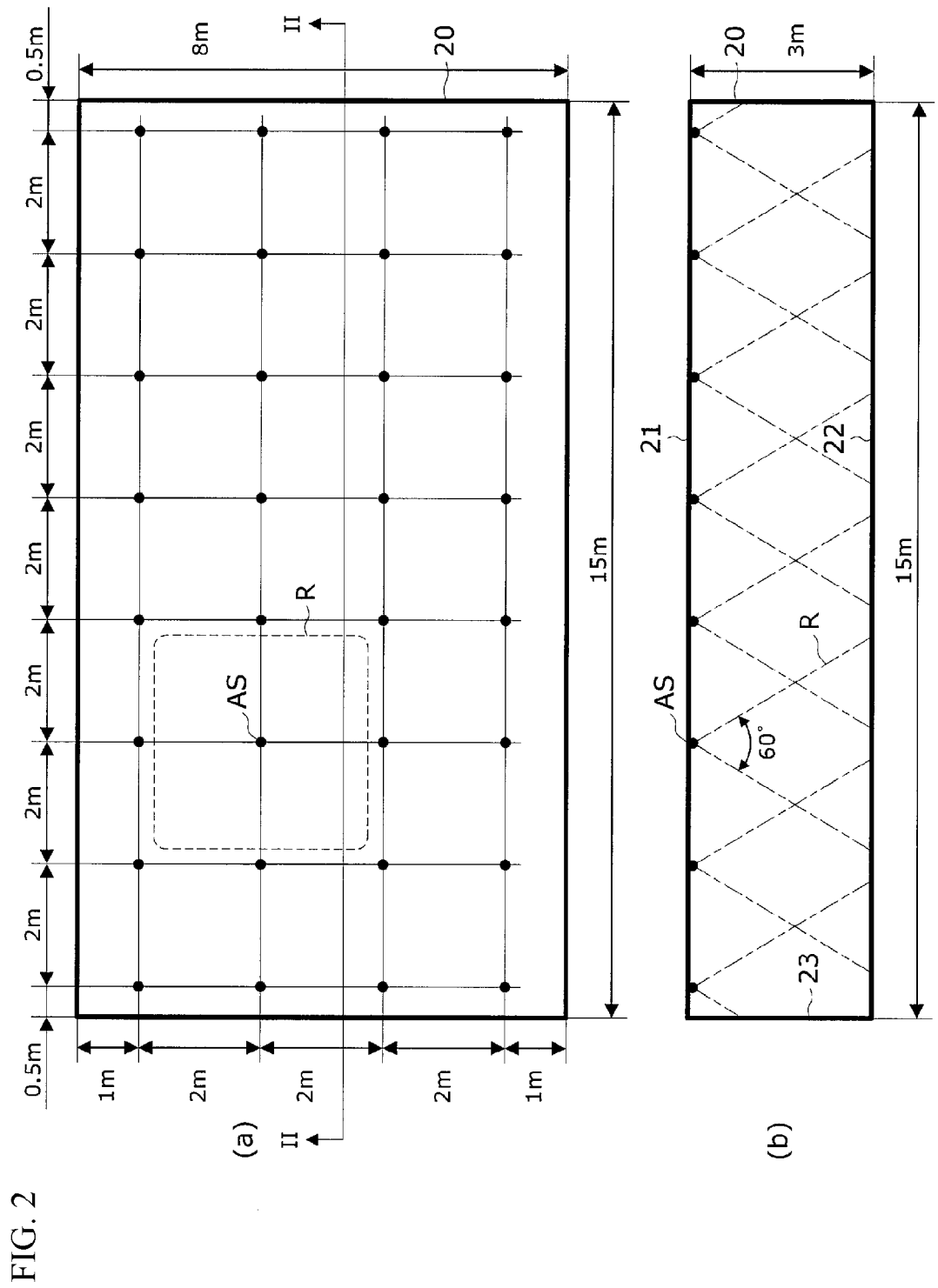
FIG. 2 is an example of an installation of thermopile array sensors within a space.

FIG. 2 is an example of an installation of thermopile array sensors within a space, where FIG. 2 (a) is a plan view diagram of the space, and FIG. 2 (b) is a cross-sectional diagram along the section II-II in FIG. 2 (a). Here 32 thermopile array sensors AS are installed in a grid with equal spacing on the ceiling 21 of a rectangular space 20. In the space 20, the width (in the long direction) is 15 m, the depth (in the short direction) is 8 m, and the height is 3 m. The thermopile array sensors AS are disposed at the intersections of a grid with 2 m spacing in the lengthwise and crosswise directions, and each has a square-shaped detecting range R in the vertical direction from the ceiling 21 to the floor 22.

Figure 3:
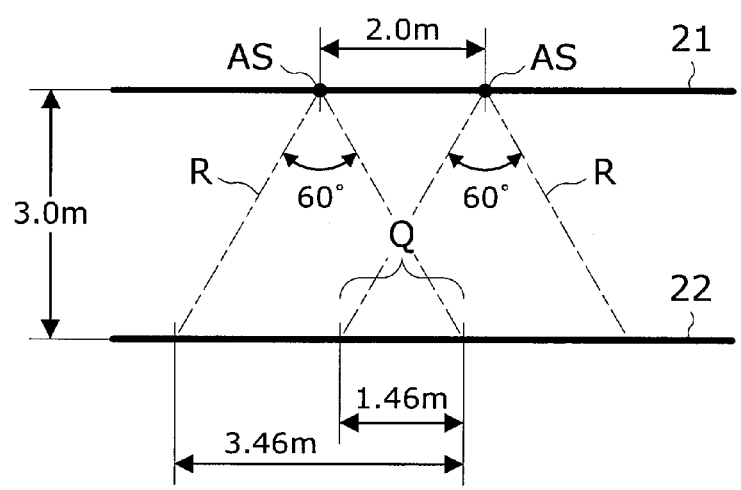
FIG. 3 is an explanatory diagram illustrating detecting ranges of thermopile array sensors.

FIG. 3 is an explanatory diagram illustrating the detecting ranges of the thermopile array sensors. In this example, the spacing with which the thermopile array sensors AS are installed is 2 m, the height of the space 20 is 3 m, and the field of view of the detecting ranges R is 60°. Because of this, the detecting range R, on the floor 22, is a square that is 3.46 m square. This produces an overlap region Q of a width of 1.46 m for the overlap of the detecting ranges R between adjacent thermopile array sensors AS. While here the explanation is for an example wherein the detecting range R is formed in a direction that is vertical from the ceiling 21 to the floor 22, it instead may be formed at an angle rather than being vertical. Moreover, the thermopile array sensors AS may be disposed on the floor 22 or the wall 23, rather than on the ceiling 21.

In the temperature detecting range identifying device 10, a storing portion 11, a detected temperature acquiring portion 12, a temperature change comparing portion 13, a factor estimating portion 13, a detecting range identifying portion 15, a screen displaying portion 16, and a detecting range outputting portion 17 are provided as the primary functional portions.

The storing portion 11 is made from a storing device, such as a hard disk or a semiconductor memory, and has the function of storing the various types of information and programs used in the temperature distribution detecting procedure. The main processing information stored in the storing portion 11 includes detected temperature data 11A, location data 11B, factor data 11C, and detecting range data 11D.

The detected temperature data 11A is the detected temperatures detected by the individual detecting elements within the thermopile array sensor AS, for each individual thermopile array sensor AS installed within the space 20. These detected temperatures are acquired through data communication with each of the thermopile array sensors AS through the communication circuit L1 by the detected temperature acquiring portion 12, and are stored in the storing portion 11. FIG. 4 is an example of a structure for the detected temperature data. Here a detected temperature tnij is stored for each detecting element Snij of each thermopile array sensor AS. Note that I×J detecting elements are arranged in the form of a grid in each thermopile array sensor ASn.

The location data 11B is coordinate data indicating the planned detecting range for each individual thermopile array sensor AS within the space 20, and is set in advance, and stored in the storing portion 11, based on design data such as the installation locations of the thermopile array sensors AS. FIG. 5 is an example of a structure for the location data. Here the coordinate data indicating the locations of reference detecting elements selected from the detecting elements within the thermopile array sensor AS, for each individual thermopile array sensor AS, are recorded as the location coordinates for the detecting ranges R. Note that each type of coordinate data used in the present example is referenced to an origin point that is set in advance in a corner or the center, for example, of the floor 22 of the space 20.

The factor data 11C is parameter data for correcting, to the location coordinates of the actual detecting ranges, the location coordinates of the planned detecting ranges for the thermopile array sensors AS, and are calculated and stored by the factor estimating portion 14. Here six types of parameters are used as positional shift factors. If the location coordinates prior to correction are defined as x, y and the positional shift factors are c0, c1, c2, c3, c4, and c5, then the location coordinates x' and y' after the correction can be expressed by the following Expression (1).

[Expression 1]

$$\begin{cases} x' = c_0 x + c_1 y + c_2 \\ y' = c_3 x + c_4 y + c_5 \end{cases} \quad (1)$$

In Expression (1), c2 and c5 are parameters indicating the parallel translation component, c0 and c4 are parameters indicating the scaling component, and c1 and c3 are parameters indicating the rotational component. The definition of these parameters as positional shift factors enables high-precision identification of the positional shift of the detecting ranges. Note that these parameters are not necessarily all essential, but may be selected depending on the accuracy required when identifying the detecting ranges. For example, if the scaling and rotation is not to be considered for the positional shift of the detecting ranges, then the parameters will be limited to only the parallel translation components.

The detecting range data 11D is data indicating the location coordinates representing the actual detecting ranges of the individual thermopile array sensors AS, and are calculated from the planned detecting ranges, defined by the location data 11B, based on the factor data 11C by the detecting range identifying portion 15, and stored in the storing portion 11. FIG. 6 is an example of a structure for the detecting range data. Here location coordinates for the detecting elements positioned at the four corners of the applicable thermopile array sensor AS are stored as the coordinates of the actual detecting range for each individual thermopile array sensor AS.

The detected temperature acquiring portion 12 has a function for acquiring detected temperatures, detected by the detecting elements within the thermopile array sensors AS, through performing data communication with each individual thermopile array sensor AS through the communication circuit L1, and a function for storing, into the storing portion 11, the detected temperature data 11A including these detected temperatures.

The temperature change comparing portion 13 has a function for comparing, for two thermopile array sensors, from among the thermopile array sensors AS, having mutually overlapping planned detecting ranges, detected temperatures over time, detected at the respective locations, for each test location on one selected thermopile array sensor side, within the overlapping region, to various comparison locations selected from the planned detecting range of the other thermopile array sensor, to identify, as the best match location, the comparison location with the highest comparison result.

Figure 7:
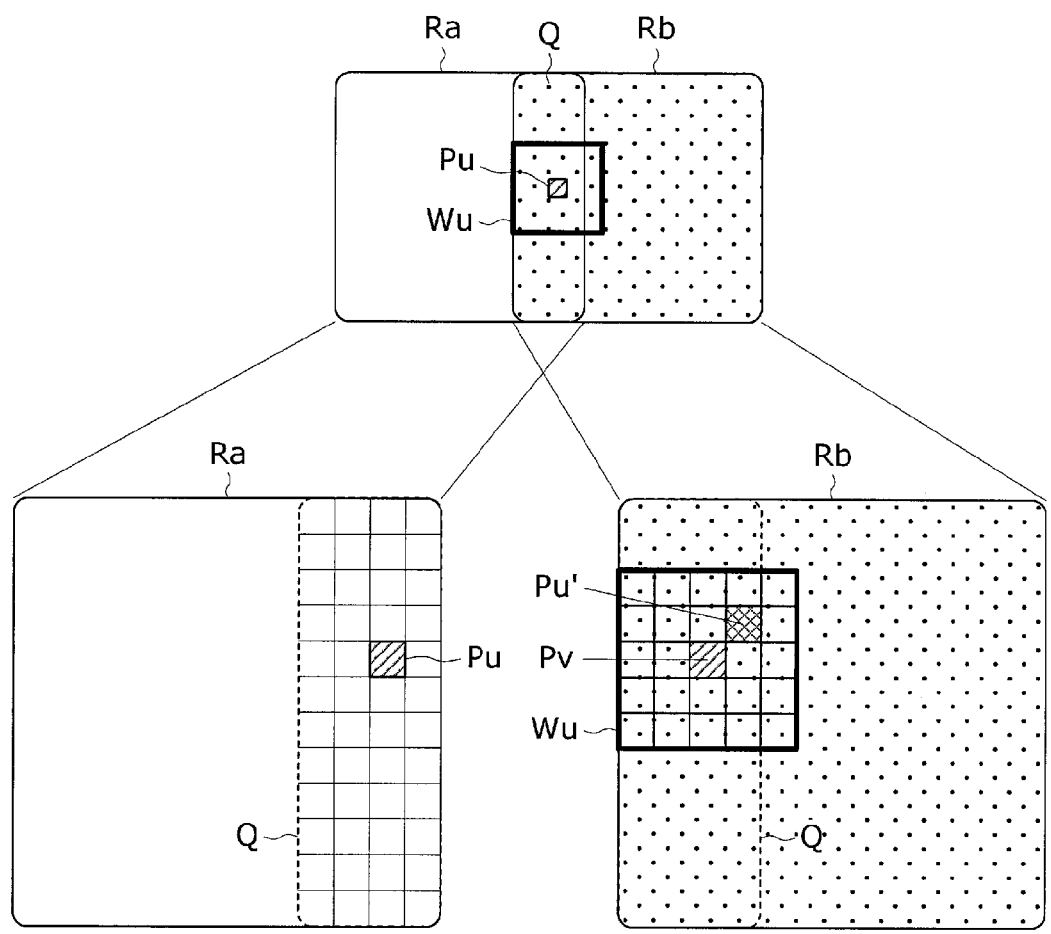
FIG. 7 is an explanatory diagram illustrating comparing temperature variations.

FIG. 7 is an explanatory diagram illustrating the comparisons of the temperature changes. Here the planned detecting ranges Ra and Rb corresponding to two adjacent thermopile array sensors ASa and ASb are illustrated, where the two partially overlap at the overlapping region Q. The test location Pu is a detecting location on the thermopile array sensor ASa side, selected from the overlapping region Q, and corresponds to one of the detecting elements in ASa. Moreover, a comparing range Wu is a range selected with Pu as the center thereof, and has a range of the maximum expected shift of the actual detecting range Rb' relative to the planned detecting range Rb. A comparing location Pv is a detecting location on the thermopile array sensor ASb side, selected from the comparing range Wu, and corresponds to one of the detecting elements in ASb.

Figure 8:
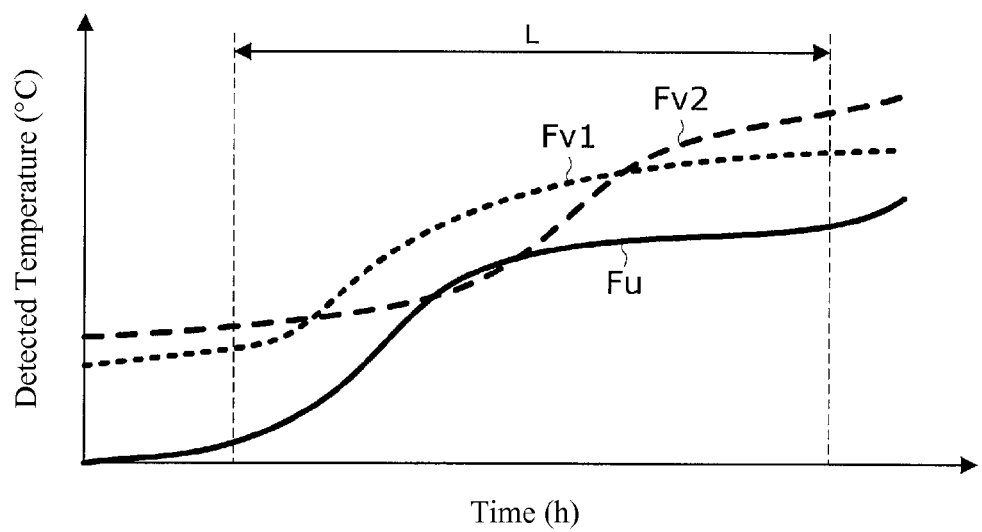
FIG. 8 is an explanatory diagram illustrating changes in detected temperatures over time.

The temperature change comparing portion 13 sequentially selects a Pv from within the comparing range Wu for a single Pu, and compares the changes in the detected temperatures tu and tv over time, detected at these Pu and Pv. FIG. 8 is an explanatory diagram illustrating the changes in the detected temperatures over time. Here the characteristic Fu is the change in the detected temperature over time, detected at Pu. Moreover, the characteristics F1 and F2 are the changes in the detected temperatures over time detected at individual Pv. L is a time span for comparing the changes over time.

If, at time 1 within the time span L the detected temperatures at Pu are tu1 and the detected temperatures at Pv are tv1, then the comparison score of these characteristics Fu and Fv can be calculated by the following Expression (2).

[Expression 2]

$$\text{score} = \frac{\sum_{l=1}^{L}(t_{ul} - \bar{t}_{ul})(t_{vl} - \bar{t}_{vl})}{\sqrt{\sum_{l=1}^{L}(t_{ul} - \bar{t}_{ul})^2} \sqrt{\sum_{l=1}^{L}(t_{vl} - \bar{t}_{vl})^2}} \quad (2)$$

As shown in Expression (2), when comparing the detected temperatures at the two detecting locations, the identification of the positional shift between the planned detecting range and the actual detecting range can be identified with excellent accuracy by comparing the changes in detected temperatures over time, rather than comparing the detected temperatures at a given time.

The temperature change comparing portion 13 calculates a comparison score for each Pv, and then selects as the best match location Pu' for the Pu the Pv that has the highest value. Doing so identifies the test location Pu, within the planned detecting range for the thermopile array sensor ASb, with the highest probability of having shifted positionally to the best match position Pu'. The temperature change comparing portion 13 specifies the best match location Pu' for each Pu within the overlapping region Q.

The factor estimating portion 14 has a function for generating, for each test location, an equation indicating the relationships between the best match location for the test location, and positional shift factors indicating the positional shift between the location coordinates indicating the test location and the position coordinates indicating the best match location, a function for estimating the positional shift factors through the least-squares method of satisfying these equations as a system, and a function for storing, into the storing portion 11, the factor data 11C including the positional shift factors thus obtained.

In FIG. 7, described above, the test location Pu, positioned within the planned detecting range Ra of the thermopile array sensor ASa corresponds to the test location Pv located within the planned detecting range Rb of the thermopile array sensor ASb. Consequently, for the best match location Pu' corresponding to Pu, Pv appears at the translation destination that is the result of the positional shift. This relationship is shown in Equation (1), above, where the equation in Expression (1) can be produced for each individual Pu.

The equations in Expression (1) typically can be expressed as a matrix equation. With the location coordinates indicating the detecting locations Puk (where k is an integer between 1 and K) in the overlapping region Gm (where m is an integer between 1 and M) as xk, yk, and the location coordinates of the best match locations Pvk corresponding to Puk as x'k, y'k, the equations above can be expressed by the following matrix Expression (3) and Expression (4).

[Expression 3]

$$\begin{bmatrix} x'_1 \\ x'_2 \\ \vdots \\ x'_K \end{bmatrix} = \begin{bmatrix} x_1 & y_1 & 1 \\ x_2 & y_2 & 1 \\ \vdots & \vdots & \vdots \\ x_K & y_K & 1 \end{bmatrix} \begin{bmatrix} c_0 \\ c_1 \\ c_2 \end{bmatrix} \quad (3)$$

[Expression 4]

$$\begin{bmatrix} y'_1 \\ y'_2 \\ \vdots \\ y'_K \end{bmatrix} = \begin{bmatrix} x_1 & y_1 & 1 \\ x_2 & y_2 & 1 \\ \vdots & \vdots & \vdots \\ x_K & y_K & 1 \end{bmatrix} \begin{bmatrix} c_3 \\ c_4 \\ c_5 \end{bmatrix} \quad (4)$$

In Expression (3) and Expression (4), if the matrix of the best match locations Pvk is defined as V and the matrix of the test locations Puk is defined as U, and the matrix of the positional shift factors c0 through c5 is defined as C, then Expression (3) and Expression (4) can be expressed as V=UC. Consequently, the result C' of estimating C through the least-squares method typically is calculated as C'=(UTU)−1UTV. Here UT is the transposed matrix of U.

The detecting range identifying portion 15 has a function for correcting, for each individual thermopile array sensor AS, each of the planned detecting ranges of the thermopile array sensors AS, obtained from the location data 11B of the storing portion 11, based on the positional shift factors for the thermopile array sensors AS obtained similarly from the factor data 11C stored in the storing portion 11, to identify the actual detecting ranges that are actually the detecting ranges for the respective thermopile array sensors AS, and a function for storing, in the storing portion 11, the actual detecting ranges thus obtained as detecting range data 11D.

The screen displaying portion 16 includes a screen displaying device, such as an LCD, and has a function for reading out the detecting range data 11D of the storing portion 11 and displaying a screen. The temperature distribution outputting portion 17 has a function for outputting, to a higher-level system 30, the detecting range data 11D, read out from the storing portion 11, through performing data communication with the higher-level system 30, such as a building control system, or a lighting system or air-conditioning system, or the like, through a communication circuit L2.

Of these functional portions, the detected temperature acquiring portion 12, the temperature change comparing portion 13, the factor estimating portion 14, the detecting range identifying portion 15, and the detecting range outputting portion 17 are embodied through a calculation processing portion wherein a program of the storing portion 11 is executed on a CPU. Note that this program is read out in advance from an external device that is connected through a communication circuit, or from a recording medium (neither of which are shown) and stored in the storing portion 11.

Figure 9:
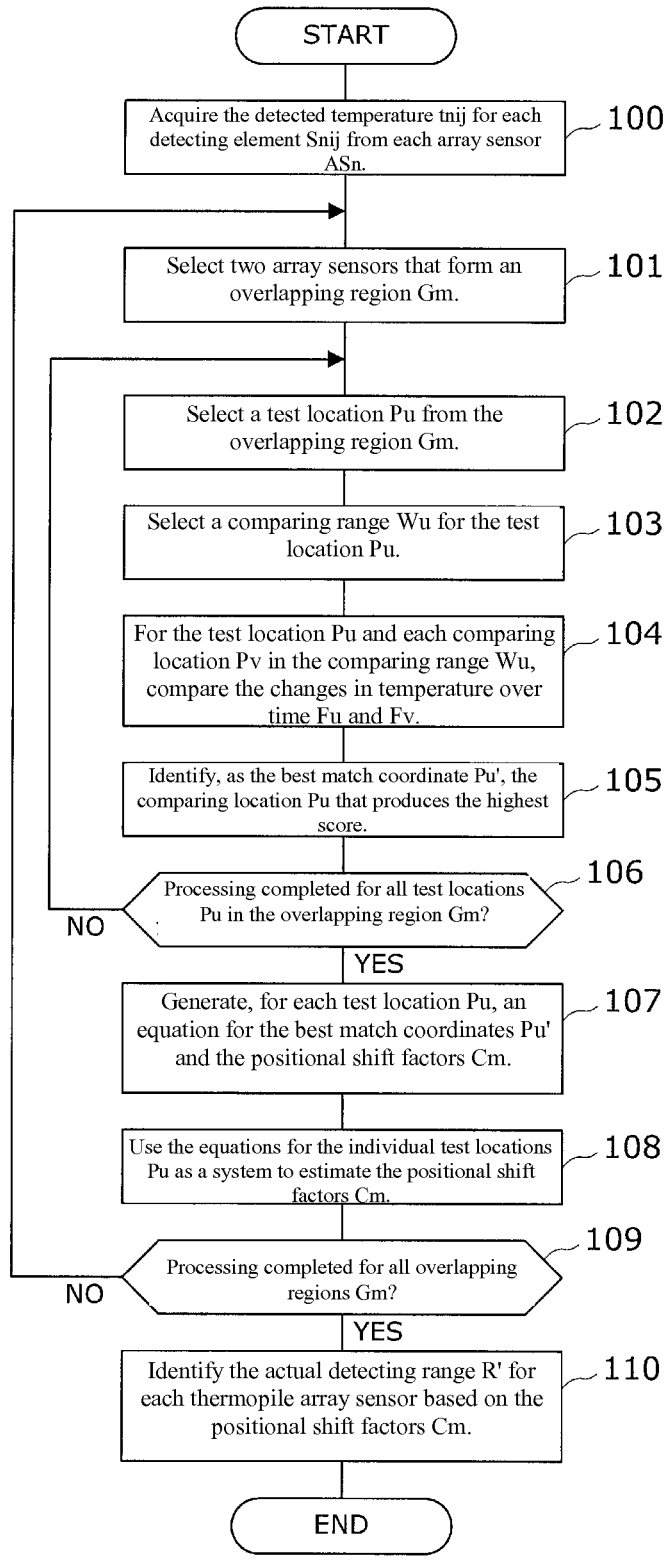
FIG. 9 is a flowchart for a temperature detecting range identifying procedure.

The operation of the temperature detecting range identifying device 10 according to the present example will be explained next in reference to FIG. 9. FIG. 9 is a flowchart showing the temperature detecting range identifying procedure.

The temperature detecting range identifying device 10 either periodically or in response to an execution instruction from the outside executes the temperature detecting range identifying procedure of FIG. 9. Here it is assumed that N thermopile array sensors ASn (where n is an integer between 1 and N) are installed within a space 20, and, of these thermopile array sensors ASn, M overlapping regions Gm (where m is an integer between 1 and M) exist between adjacent thermopile array sensors ASn. Moreover, K detecting locations Pu exist within an overlapping region Gm, and H comparing locations Pv exist within a comparing range Wu.

First the detected temperature acquiring portion 12 obtains, from the individual thermopile array sensors ASn that are installed within the space 20, the detected temperatures tnij detected by the individual detecting elements Sij within the given thermopile array sensor ASn, and stores them in the memory portion 11 as detected temperature data 11A (Step 100).

Next the temperature change comparing portion 13, based on the location data 11B of the storing portion 11, selects two thermopile array sensors ASma and ASmb that form an overlapping region Gm (Step 101), selects a test location Pu on the ASma side from the overlapping region Gm (Step 102), and selects a comparing range Wu on the ASmb side corresponding to Pu (Step 103).

Following this, the temperature change comparing portion 13, for the Pu and each comparing location Pv within the comparing range Wu, reads out the detected temperature data 11A from the storing portion 11, and compares the changes Fu and Fv over time for the time span L (Step 104), to identify, as the best match location Pu' for the Pu, the comparing location Pv that produces the highest score (Step 105).

Here, for each test location Pu within the overlapping region Gm, if the Pu is not the end of the identifying procedure for the best match location Pu' (Step 106: NO), control returns to Step 102, and the procedure for identifying the best match location Pu' for a non-selected Pu is executed repeatedly. When the procedure for identifying the best match location Pu' has been completed for all test locations Pu (Step 106: YES), the factor estimating portion 14 generates, for each Pu within the overlapping region Gm, an equation for the Pu' and the positional shift factors Cm (Step 107), and solves the system of equations using the least-squares method to estimate the positional shift factors Cm, and stores them as factor data 11C in the storing portion 11 (Step 108).

Thereafter, if there is an overlapping region Gm for which the procedure for estimating the positional shift factors Cm has not been completed from among all of the overlapping regions Gm (Step 109: NO), then control returns to Step 101, and the procedure for estimating the positional shift factors Cm is repeated for a non-selected Gm.

Once the procedure for estimating the positional shift factors Cm has been completed for all of the overlapping regions Gm (Step 109: YES), then the detecting range identifying portion 15 corrects each of the planned detecting ranges of the respective thermopile array sensors AS, acquired from the location data 11B of the storing portion 11, based on the positional shift factors for the respective thermopile array sensors AS, obtained similarly from the factor data 11C of the storing portion 11, for each individual thermopile array sensor AS, to identify the actual detecting range that is the range actually detected by the thermopile array sensor AS, and stores, in the storing portion 11, the actual detecting range that has been obtained, as detecting range data 11D (Step 110), to complete the series of temperature detecting range identifying procedures.

As a result, the detecting range data 11D is read out from the storing portion 11 and displayed on the screen by the screen displaying portion 16, or outputted to the higher-level system 30 by the detecting range outputting portion 17.

Figure 10:
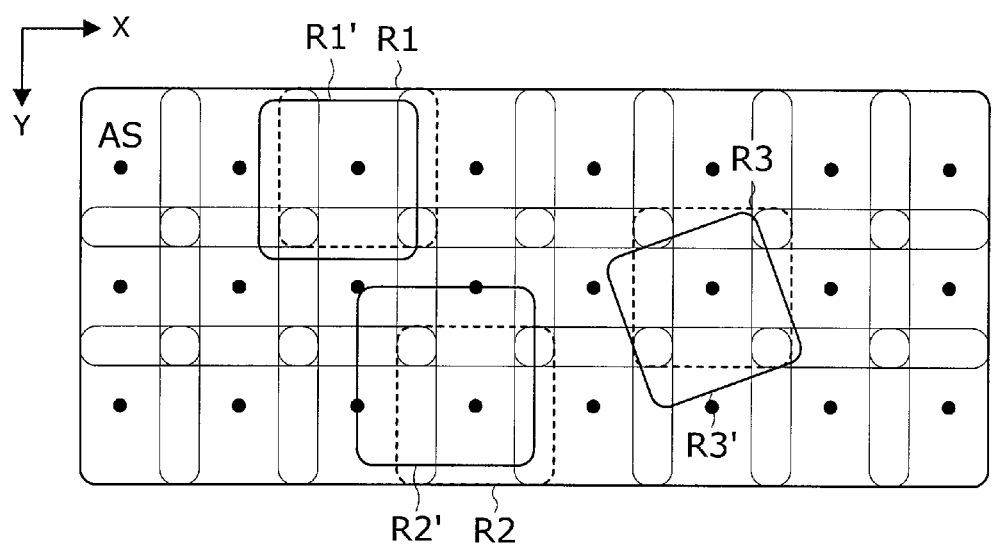
FIG. 10 is an example of a screen display of the detecting range data.

FIG. 10 is an example of a screen display of the detecting range data. Here the planned detecting range and the actual detecting range are displayed for each thermopile array sensor AS in the example installation of FIG. 2. For example, the actual detecting range R1' can be seen to be shifted to the position that is a parallel translation in the X direction and the Y direction from the corresponding planned detecting range R1. Moreover, the actual detecting range R2' can be seen to be a parallel translation in the X direction and the Y direction, along with an increased scale, from the corresponding planned detecting range R2. Moreover, the actual detecting range R3' can be seen to be a translation in the X direction and Y direction, along with a rotation in the clockwise direction, from the corresponding planned detecting range R3.

In this way, in the present example, the detected temperature acquiring portion 12 acquires detected temperatures from each individual thermopile array sensor AS, the temperature change comparing portion 13 compares, for each pair of thermopile array sensors wherein a portion of the planned detecting ranges mutually overlap, changes in detected temperatures over time, detected at each location, between each test location selected from the overlapping region and each comparing location, to identify a best match location, and the factor estimating portion 14, for each test location, generates an equation indicating the relationship between the best match location and positional shift factors, and the system of these equations is solved through the least-squares method to estimate the positional shift factors, where the detecting range identifying portion 15 corrects the location coordinates of the planned detecting range based on these positional shift factors, to identify the actual detecting range.

As a result, it is possible to check easily the partial overlap of the detecting ranges for adjacent thermopile array sensors. As a result, when equipment such as lighting equipment, air-conditioning equipment, fire prevention equipment, electrical equipment, or the like, is installed in a location planned for the installation of a thermopile array sensor, so that the thermopile array sensor is installed near to that equipment and the detecting range of the thermopile array sensor is caused to be at an angle, checking whether or not there is a partial overlap between the detecting ranges of adjacent thermopile array sensors can be performed extremely easily, making it possible to detect the temperature distribution within the space 20 without gaps.

Moreover, in the present example, when, for the equations, the location coordinates of the test locations are defined as x, y, the location coordinates for the best match locations are defined as x', y', and the positional shift factors are defined as c0, c1, c2, c3, c4, and c5, it is possible to define not just the parallel translation of the planned detecting range, as shown in Expression (1), described above, but also the scale and rotation as well. Consequently, it is possible to define the positional shift of the detecting ranges with high accuracy.

While the present invention was explained above in reference to examples, the present invention is not limited by the examples set forth above. The structures and details of the present invention may be modified in a variety of ways, as can be understood by those skilled in the art, within the scope of the present invention. Moreover, the present invention may be embodied through combining the various examples, insofar as there are no contradictions.

The invention claimed is:

1. A temperature detecting range identifying device comprising:
storage that stores location coordinates of a planned detecting range over which a thermopile array sensor is to detect temperatures, for each of a plurality of thermopile array sensors installed in a space for which a temperature distribution is to be detected;
a detected temperature acquirer that acquires detected temperatures from each individual thermopile array sensor;
a first thermopile array sensor, from the plurality of thermopile array sensors, the first thermopile array sensor having a first planned detecting range;
a second thermopile array sensor, from the plurality of thermopile array sensors, the second thermopile array sensor having a second planned detecting range including an overlap region which partially overlaps the first planned detecting range;
a plurality of test locations associated with the first thermopile array sensor and located within the overlap range;
a plurality of comparing locations associated with the second thermopile array sensor and located within the overlap range;
a temperature change comparer that compares a change in detected temperatures over time detected by the first thermopile array sensor at each of the respective test locations and a change in detected temperatures over time detected by the second thermopile array sensor at each of the respective comparing locations to identify a best match location for each test location wherein a highest comparison result is obtained;
a factor estimator that generates, for each test location of the plurality of test locations, a system of equations expressing a relationship between the best match location for the test location and positional shift factors indicating a positional shift between a location coordinate indicating the test location and a location coordinate indicating the best match location and solves the system of equations expressing the relationship between the best match location and the positional shift factors using a least-squares method to estimate the positional shift factors; and
a detecting range identifier that identifies an actual identifying range for the second thermopile array sensor by correcting the location coordinates of the planned detecting range for the second thermopile array sensor based on the positional shift factors.

2. The temperature detecting range identifying device as set forth in claim 1, wherein, when the location coordinates of the test location are defined as x, y, the location coordinates of the best match location are defined as x', y', and the positional shift factors are defined as c0, c1, c2, c3, c4, and c5, the equations are expressed as:

$$x' = c_0 x + c_1 y + c_2; \text{ and}$$

$$y' = c_3 x + c_4 y + c_5.$$

3. A temperature detecting range identifying method comprising:
storing location coordinates of a planned detecting range over which a thermopile array sensor is to detect temperatures, for each of a plurality of thermopile array sensors installed in a space for which a temperature distribution is to be detected;
acquiring detected temperatures from a first thermopile array sensor and a second thermopile array sensor from the plurality of thermopile array sensors;
wherein the first thermopile array sensor has a first planned detecting range and the second thermopile array sensor has a second planned detecting range which includes an overlap region which partially overlaps the first planned detecting range;
comparing the change in detected temperatures over time detected at a plurality of test locations associated with the first thermopile array sensor and located within the overlap range and at a plurality of comparing locations associated with the second thermopile array sensor and located within the overlap range to identify a best match location for each test location wherein the highest comparison result is obtained;
generating, for each test location of the plurality of test locations, a system of equations expressing the relationship between the best match location for the test location and positional shift factors indicating a positional shift between a location coordinate indicating the test location and a location coordinate indicating the best match location;
solving the system of equations expressing the relationship between the best match location and the positional shift factors using the least-squares method to estimate the positional shift factors; and
identifying an actual identifying range for the second thermopile array sensor by correcting the location coordinates of the planned detecting range for the second thermopile array sensor based on the positional shift factors.

4. A temperature detecting range identifying system comprising:
a processor;
a plurality of thermopile array sensors operatively connected to the processor and installed in a space for which a temperature distribution is to be detected, the plurality comprising:
a first thermopile array sensor, from the plurality of thermopile array sensors, the first thermopile array sensor having a first planned detecting range;
a second thermopile array sensor, from the plurality of thermopile array sensors, the second thermopile array sensor having a second planned detecting range including an overlap region which partially overlaps the first planned detecting range;
memory, operatively connected to the processor, comprising instructions which when executed by the processor cause the processor to execute a method comprising:
storing location coordinates of a planned detecting range over which each thermopile array sensor of the plurality is to detect temperatures;
acquiring detected temperatures from the first thermopile array sensor and the second thermopile array sensor;
comparing a change in detected temperatures over time detected by the first thermopile array sensor at the respective test locations and a change in detected temperatures over time detected by the second thermopile array sensor at the respective comparing locations to identify a best match location for each test location wherein a highest comparison result is obtained;
generating, for each test location of the plurality of test locations, a system of equations expressing the relationship between the best match location for the test location and positional shift factors indicating a positional shift between a location coordinate indicating the test location and a location coordinate indicating the best match location;

solving the system of equations expressing the relationship between the best match location and the positional shift factors using the least-squares method to estimate the positional shift factors; and identifying an actual identifying range for the second thermopile array sensor by correcting the location coordinates of the planned detecting range for the second thermopile array sensor based on the positional shift factors.

* * * * *